United States Patent
Pu et al.

(10) Patent No.: US 10,133,929 B2
(45) Date of Patent: Nov. 20, 2018

(54) POSITIONING METHOD AND POSITIONING DEVICE FOR UNMANNED AERIAL VEHICLE

(71) Applicant: ZEROTECH (Shenzhen) Intelligence Robot Co., Ltd., Shenzhen (CN)

(72) Inventors: Qing Pu, Beijing (CN); Jian-Jun Yang, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 142 days.

(21) Appl. No.: 15/394,589

(22) Filed: Dec. 29, 2016

(65) Prior Publication Data

US 2017/0193271 A1 Jul. 6, 2017

(30) Foreign Application Priority Data

Dec. 31, 2015 (CN) .......................... 2015 1 1032320

(51) Int. Cl.
*H04N 7/18* (2006.01)
*G06K 9/00* (2006.01)
*G06T 7/73* (2017.01)

(52) U.S. Cl.
CPC .............. *G06K 9/0063* (2013.01); *G06T 7/73* (2017.01); *G06T 2207/10016* (2013.01); *G06T 2207/10024* (2013.01); *G06T 2207/10032* (2013.01); *G06T 2207/30204* (2013.01); *G06T 2207/30244* (2013.01); *G06T 2207/30252* (2013.01)

(58) Field of Classification Search
CPC ...................................... G06K 9/0063
USPC ........................................... 348/144
See application file for complete search history.

(56) References Cited

U.S. PATENT DOCUMENTS 8,374,391 B1 * 2/2013 Erignac .............. G06K 9/00637
345/421
9,495,597 B2 * 11/2016 Hundley ............ G06K 9/00657

* cited by examiner

*Primary Examiner* — Leron Beck (57) ABSTRACT

A positioning method for unmanned aerial vehicle is disclosed. A first photo and a second photo of a predetermined form are first obtained, a first color card image of a color card is recognized from the first photo, and a second color card image of the same color card is recognized from the second photo, wherein the predetermined form includes a number of color cards. A first geometric center point coordinate and a first barycentric point coordinate of the first color card image are calculated. A reference line on the color card is obtained by mapping the first geometric center point coordinate and the first barycentric point coordinate to the color card, and a rotation angle of the UAV based on the reference line is obtained. A positioning method to get the flight speed for the UAV and a positioning device is also disclosed.

19 Claims, 6 Drawing Sheets

--- obtaining a first photo and a second photo of a predetermined form, recognizing a first color card image from the first photo, and a second color card image from the second photo by matching the first photo and the second photo, wherein the predetermined form comprises a plurality of color cards, and the first color card image and the second color card image are corresponding to the same target color card in the plurality of color cards — 110 calculating a first geometric center point coordinate and a first barycentric point coordinate of the first color card image based on a photo coordinate system, determining a reference line on the target color card by mapping the first center point coordinate and the first barycentric point coordinate to the target color card, and obtaining a rotation angle of the UAV based on the reference line — 120 calculating a second geometric center point coordinate of the second color card image, determining a distance between the first geometric center point and the second geometric center point, and calculating a flight speed based on the distance — 130

POSITIONING METHOD AND POSITIONING DEVICE FOR UNMANNED AERIAL VEHICLE

CROSS-REFERENCE TO RELATED APPLICATIONS

This application claims all benefits accruing under 35 U.S.C. § 119 from China Patent Application No. 201511032320.6, filed on Dec. 31, 2015 in the State Intellectual Property Office of China, the content of which are hereby incorporated by reference.

TECHNICAL FIELD

The present disclosure relates to positioning methods and positioning devices for unmanned aerial vehicles.

BACKGROUND

A traditional low cost positioning method for an unmanned aerial vehicle (UAV) in a small area is typically based on color cards.

At present, the color cards in the traditional positioning method have as many as 10 to 20 colors. However, these colors of the color cards are difficult for the UAV to distinguish, such as the colors light yellow and beige. Therefore, the recognition error rate is relatively high during the positioning process.

In another positioning method, tetragonal color cards are used in the positioning method. However, this positioning method is unable to effectively identify a rotation angle and the position of a rotating UAV.

BRIEF DESCRIPTION OF THE DRAWINGS

Implementations are described by way of example only with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

In the present disclosure, the terms "vertical," "horizontal" and other similar direction-indicating terms are used with reference to the UAV in its normal operational mode, and should not be considered limiting.

Figure 1:
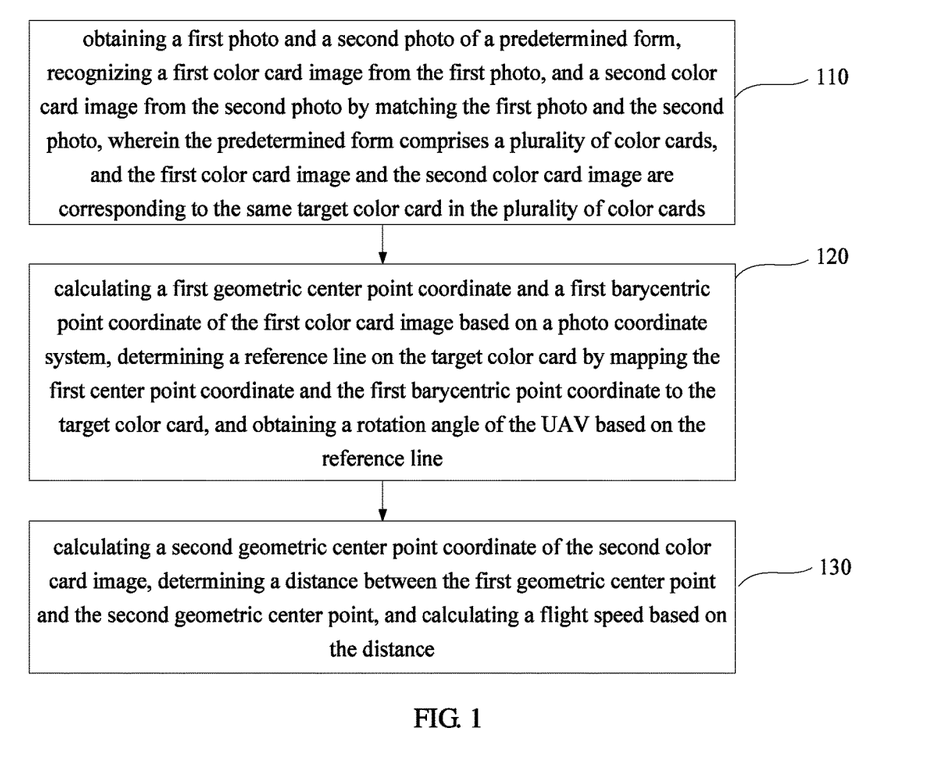
FIG. 1 is a flowchart of one embodiment of a positioning method for a UAV.

Referring to FIG. 1, one embodiment of a positioning method for an unmanned aerial vehicle (UAV) is disclosed. The positioning method is configured to obtain a flight speed and/or a rotation angle of the UAV through getting photos of color cards. The positioning method can be performed by a positioning device, and the positioning device can be configured in a computer.

The positioning method for the UAV comprises:

S110, obtaining a first photo and a second photo of a predetermined form, recognizing a first color card image from the first photo, and a second color card image from the second photo by matching the first photo and the second photo, wherein the predetermined form comprises a plurality of color cards, and the first color card image and the second color card image are corresponding to the same target color card in the plurality of color cards;

S120, calculating a first geometric center point coordinate and a first barycentric point coordinate of the first color card image based on a photo coordinate system, determining a reference line on the target color card by mapping the first center point coordinate and the first barycentric point coordinate to the target color card, and obtaining a rotation angle of the UAV based on the reference line; and

S130, calculating a second geometric center point coordinate of the second color card image, determining a distance between the first geometric center point and the second geometric center point, and calculating a flight speed based on the distance.

The plurality of color cards can be different from each other, such as by color and pattern. The plurality of color cards can be distributed on the ground or a substantially flat surface to form the predetermined form. A contour of the predetermined form can be a circle, square, or other shape. The UAV can be hovering or flying in the air above or over (e.g., in an oblique direction of) the predetermined form.

In S110, a camera on the UAV can be configured to capture photos of the predetermined form in real-time or periodically. Each photo can comprise an image showing a part of or the entire predetermined form. A positioning device can receive the photos from the camera. The positioning device is configured to process the photos and output a rotation angle and/or a speed of the UAV through processing the photos. In one embodiment, the positioning device receives and processes the photos from the camera in real-time. The positioning device can be mounted on the UAV and receive the photos from the camera through signal wires, or can be located on the ground and receive the photos from the camera through wireless communication between the UAV and a ground station.

The positioning device can recognize a color card image corresponding to one target color card in the predetermined form from each photo by matching the captured photos, through which a mapping relationship between the recognized target color card and the color card image can be established. In one embodiment, the positioning device recognizes a plurality of color card images corresponding to a plurality or all of the color cards, and a one-to-one mapping relationship between the color card images in the photo and the color cards in the predetermined form can be established. In one embodiment, the positioning device receives and processes multiple photos taken at different moments, and can recognize multiple color card images from the multiple photos, and map the multiple color card images to the target color card in the predetermined form. It can be understood that because of the flight height of the UAV, the size of the predetermined form, and the environment, the photos captured by the camera may have different resolutions. Thus, the positioning device may not be able to, and there is no need to, recognize all of the color cards in the predetermined form from each photo.

In one embodiment, the first photo and the second photo can be captured by the camera at different moments within a time interval. By matching the first photo and the second photo, the first color card image and the second color card image can be respectively recognized from the first photo and the second photo corresponding to the same target color card in the predetermined form. Thus the target color card can be determined through the first color card image and the second color card image.

In S120, after the positioning device recognizes the color card image from the photos, the target color card can be obtained, and the positioning device can calculate the geometric center point coordinate and the barycentric point coordinate of the color card image. The barycentric point coordinate of the color card image can be calculated based on a color distribution in the color card image. In one embodiment, a photo coordinate system can be created on the photo, and a point (e.g., a corner, a center, or other point) of the photo can be defined as an origin of the photo coordinate system. The geometric center point coordinate of the color card image in the photo coordinate system can be obtained. The barycentric point coordinate of the color card image in the photo coordinate system can be calculated based on the geometric center point coordinate. A line segment connecting the geometric center point coordinate and the barycentric point coordinate (shorted as "C-B line") of the color card image can be obtained. Because the color card image corresponds to the recognized target color card in the predetermined form, the C-B line can be mapped to the target color card to get the reference line. The geometric center point coordinate and the barycentric point coordinate of the target color card can be obtained in a card coordinate system in which the target color card is located. Based on the reference line and a direction change of UAV relative to the reference line, the rotation angle of the UAV can be obtained.

It can be understood that, the different color card images in the same photo have different geometric center point coordinates. Thus, the positioning device can calculate different C-B lines for the different color card images, and the different C-B lines can be mapped to different color cards to obtain a plurality of reference lines. Therefore, the rotation angle of the UAV can be calculated based on the plurality of reference lines. The calculated rotation angle of the UAV based on different reference lines can be equal. In order to avoid a calculation error, the rotation angle of the UAV can be calculated based on at least three reference lines.

In one embodiment, the first geometric center point coordinate and the first barycentric point coordinate of the first color card image can be calculated based on the photo coordinate system created in the first photo. Thus, the C-B line between the first geometric center point coordinate and the first barycentric point coordinate can be obtained. By mapping the first geometric center point coordinate and the first barycentric point coordinate to the target color card, the C-B line on the target color card can be obtained. The C-B line on the target color card is referred as the reference line.

In S130, the camera captures two different photos at different moments. After the positioning device recognizes the color card image of the target color card from the two different photos, the geometric center point coordinates of the color card images in the two different photos can be calculated respectively. In detail, the geometric center point coordinates of the color card images in the two different photos can be calculated based on the photo coordinate system. The two different photos are captured in the certain time interval, thus the change of the geometric center point coordinate between the two photos represents a pixel distance that the UAV moved in the photo within this time interval.

In one embodiment, the method of calculating the second geometric center point coordinate of the second color card image in the second photo can be similar to the method of calculating the first geometric center point coordinate.

The flight speed can be calculated based on the geometric center point coordinates of one color card image in different photos, and the rotation angle of the UAV can be calculated based on the geometric center point coordinate and the barycentric point of one color card image in different photos. The flight speed and the rotation angle can be calculated at the same time. Furthermore, the calculation of the flight speed and the rotation angle has no particular sequence, and it can be selected according to need. In addition, the positioning device can also be used to navigate the UAV based on the positioning method. In one embodiment, a desired rotation angle or a desired flight speed can be input into the positioning device, and the position device can control the UAV based on the positioning method for the UAV.

In the positioning method for the UAV, the rotation angle is calculated based on the geometric center point coordinate and the barycentric point coordinate of the color card images in the photos, and the flight speed can be obtained based on the geometric center point coordinates of the same color card image in different photos. Therefore, the positioning method for the UAV does not rely on a satellite positioning signal. The positioning method for the UAV is low in cost, and easy to be performed. By using the positioning method, the UAV is easy to be controlled. Furthermore, the positioning method for the UAV has a high positioning speed and a high positioning accuracy.

Figure 2:
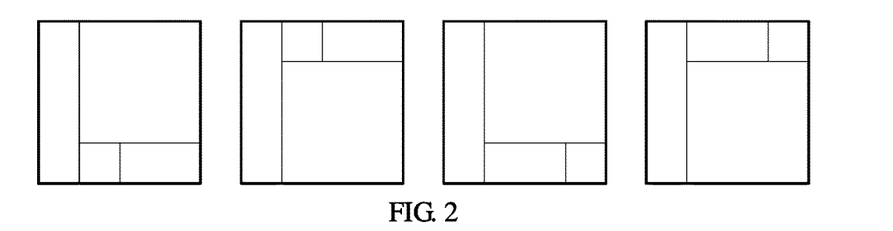
FIG. 2 is a schematic view of one embodiment of four different color cards without color.

In one embodiment, each of the plurality of color cards has its own color pattern on the surface. The color pattern can be non-uniform (e.g., non-rotational symmetry). The plurality of color cards can be different from each other in the color patterns. In one embodiment, each of the plurality of color cards is a square which is divided into 16 equal square blocks. The 16 equal square blocks belong to four set, groups, or districts. A first district comprises 9 square blocks arranged in a 3×3 pattern having a square shape. A second district comprises 4 square blocks arranged in 1×4 pattern having a rectangular shape. A third district comprises 2 square blocks arranged in a 1×2 pattern and having a rectangular shape. A fourth district comprises 1 square block with a square shape. An area ratio among the first district, the second district, the third district, and the fourth district is 1:2:4:9. Therefore, the four districts are distributed non-uniformly in each of the plurality of color cards. Referring to FIG. 2, in order to avoid one of the plurality of color cards being the same as another color card after being rotated, the four districts have four different distributions in the plurality of cards. After the plurality of color cards are rotated, the distributions of the four districts are different from each other. Thus, each color card is different from other color cards even after being rotated.

Figure 3:
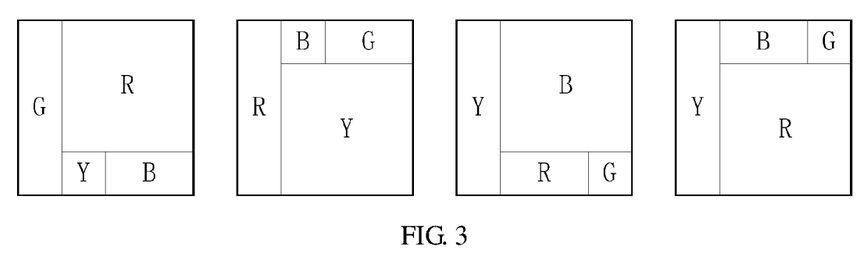
FIG. 3 is a schematic view of one embodiment of a plurality of color cards filled with different colors.

In one embodiment, each color card has a different color distribution among the four districts. The first district, the second district, the third district, and the fourth district can be filled with four different colors, such as a first color, a second color, a third color, and a fourth color, respectively. The four colors in each two color cards have different color distributions. The first color, the second color, the third color, and the fourth color can be red (R), green (G), blue (B), and yellow (Y), respectively. Referring to FIG. 3, both the distribution of colors and the distribution of districts in the four color cards are different from each other. Thus, the four colors in each of the plurality of color card are distributed non-uniformly, and the geometric center point coordinate and the barycentric point coordinate are different. Because the four districts in each color card can have four different distributions, and each district can be filled with one of the fourth colors, 256 different color cards can be obtained. Each color card can have a different pattern from the other color cards.

Figure 4:
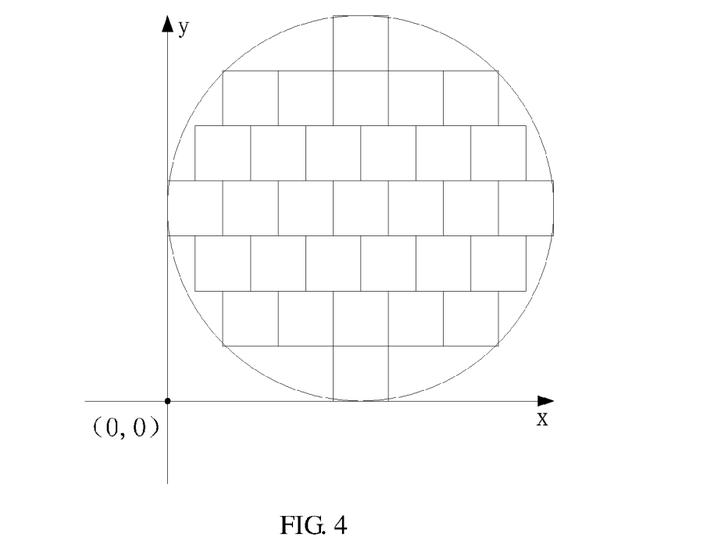
FIG. 4 is a schematic view of one embodiment of a predetermined form in a card coordinate system.

As the plurality of color cards are obtained, the plurality of color cards can be arranged to form a predetermined form. Referring to FIG. 4, in one embodiment, the plurality of color cards can be arranged in a round shape. In other embodiments, the plurality of color cards can be arranged in a rectangular shape or other shape according to need. In one embodiment, each color card is square with a side length of 20 centimeters. Each color card in the predetermined form can have a fixed position, and the UAV can be navigated based on the predetermined form.

Figure 5:
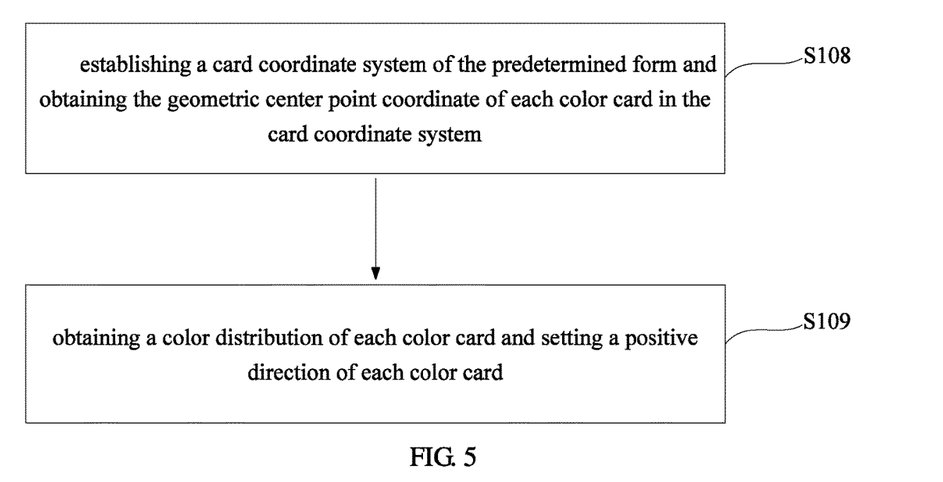
FIG. 5 is a flowchart of one embodiment of a method for obtaining a geometric center point coordinate and a color distribution of each of the plurality of color cards according to FIG. 4.

After the plurality of color cards are arranged to form the predetermined form, the positioning device for the UAV can store the card coordinate system of the predetermined form, the district distribution and color distribution of each color card, and the geometric center point coordinate of each color card. Referring to FIG. 5, before obtaining the first photo and the second photo of the predetermined form, the positioning method for the UAV can further comprise:

S108, establishing a card coordinate system of the predetermined form and obtaining the geometric center point coordinate of each color card in the card coordinate system; and S109, obtaining a color distribution of each color card and setting a positive direction of each color card.

In S108, while the contour of the predetermined form is circle, the origin (0, 0) can be established at an intersect point of two vertical intersected tangents of the circle, and the card coordinate system can be established. After the card coordinate system is established, the geometric center point coordinate of each color card in the predetermined form can be obtained and can be stored in the positioning device. It can be understood that, the origin can also be established at other point, and the geometric center point coordinate of each color card can be changed accordingly.

In S109, after the card coordinate system is established, the positioning device can collect and store the color distribution and the geometric center point coordinate of each color card respectively. Furthermore, in order to calculate the rotation angle, the positive direction of each color card can be preset. In one embodiment, the positive direction can be set as the y-axis of the card coordinate system.

Figure 6:
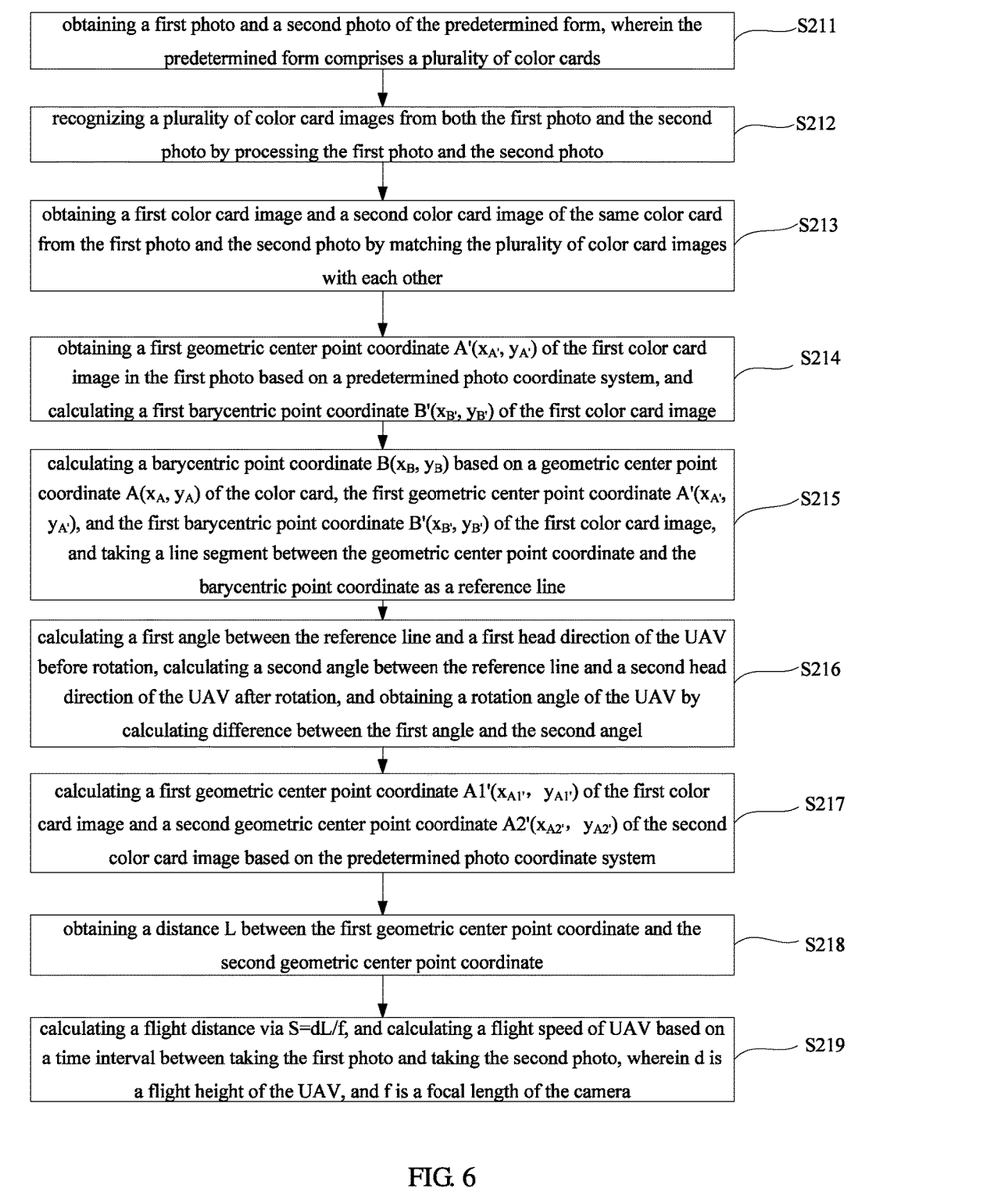
FIG. 6 is a flowchart of another embodiment of the positioning method for the UAV.

Based on S108 and S109, the positioning method for the UAV can be used to calculate the rotation angle and the flight speed of the UAV. Referring to FIG. 6, the positioning method for the UAV comprises:

S211, obtaining a first photo and a second photo of the predetermined form, wherein the predetermined form comprises a plurality of color cards;

S212, recognizing a plurality of color card images from both the first photo and the second photo by processing the first photo and the second photo;

S213, obtaining a first color card image and a second color card image from the first photo and the second photo by matching the plurality of color card images with each other, wherein the first color card image and the second color card image are corresponding to the same target color card;

S214, obtaining a first geometric center point coordinate $A'(x_{A'}, y_{A'})$ of the first color card image in the first photo based on a predetermined photo coordinate system, and calculating a first barycentric point coordinate $B'(x_{B'}, y_{B'})$ of the first color card image;

S215, calculating a barycentric point coordinate $B(x_B, y_B)$ based on a geometric center point coordinate $A(x_A, y_A)$ of the target color card, the first geometric center point coordinate $A'(x_{A'}, y_{A'})$, and the first barycentric point coordinate $B'(x_{B'}, y_{B'})$ of the first color card image, and taking a line segment between the geometric center point coordinate and the barycentric point coordinate as a reference line;

S216, calculating a first angle between the reference line and a first head direction of the UAV before rotation, calculating a second angle between the reference line and a second head direction of the UAV after rotation based on the second color card image in the second photo, and obtaining a rotation angle of the UAV by calculating difference between the first angle and the second angel;

S217, calculating a first geometric center point coordinate $A1'(x_{A1'}, y_{A1'})$ of the first color card image and a second geometric center point coordinate $A2'(x_{A2'}, y_{A2'})$ of the second color card image based on the predetermined photo coordinate system;

S218, obtaining a distance L between the first geometric center point coordinate and the second geometric center point coordinate; and S219, calculating a flight distance via S=dL/f, and calculating a flight speed of UAV based on a time interval between taking the first photo and taking the second photo, wherein d is a flight height of the UAV, and f is a focal length of the camera.

In S211, the UAV comprises camera equipped at the bottom of the UAV to capture the photos of predetermined form on the ground or on the flat surface. The camera can capture the photos in real-time or with a time interval. The positioning device can obtain the photos from the camera and record the time interval. The UAV flies above or around the predetermined form. Thus, the camera can capture at least a part of the predetermined form or entire predetermined form.

In S212, because the photos comprises at least a part of the predetermined form, at least one of the target color card in the predetermined form is captured by the camera, and the positioning device can recognize the color card image corresponding to the target color card.

In S213, the positioning device can respectively recognize the first and second color card images corresponding to the same color card from the first photo and the second photo. The first color card image and the second color image have the same pattern as one of the plurality of color cards, thus the target color card can be obtained. The positioning device can recognize a plurality of pre-matching color card images from the first photo and the second photo, match the pre-matching color card images between the first photo and the second photo, and recognize the color card images of the same target color card from the first photo and the second photo.

It can be understood that, the rotation angle and flight speed of the UAV can be calculated one after another or at the same time according to need.

In S214, the photo coordinate system is previously stored in the positioning device. Thus, for the first photo or the second photo, the positioning device can calculated the geometric center point coordinate of the first color card image or the second color card image. Taking the first photo for example, the positioning device can calculated the first geometric center point coordinate A'($x_{A'}$, $y_{A'}$) of the first color card image in the first photo based on the photo coordinate system. The first barycentric point coordinate B'($x_{B'}$, $y_{B'}$) of the first color image can be calculated through formulas:

$$x_{B'} = \frac{\iint x dx dy}{\iint dx dy}, y_{B'} = \frac{\iint y dx dy}{\iint dx dy};$$

wherein x is the pixel value along the x axis, y is the pixel value along the y axis. The pixel value relates to the color information of the image. In one embodiment, the pixel value can be the grey value of the image.

It can be understood that, the positioning device can calculate the geometric center point coordinate and the barycentric point coordinate of other recognized color card images in the first photo. Furthermore, the positioning device of the UAV can calculate a second geometric center point coordinate and a second barycentric point coordinate of color card image in the second photo.

In S215, the barycentric point coordinate B($x_B$, $y_B$) can be calculated by:

$$x_B = (x_{B'} - x_{A'}) \times s + x_A, y_B = (y_{B'} - y_{A'}) \times s + y_A;$$

wherein s=d/f, s is a ratio between an actual distance in the predetermined form and a single pixel size of the photo taken by the camera, d is a flight height of the UAV, and f is a focal length of the camera for taking the photos. After the positioning device obtains the first geometric center point coordinate and the first barycentric point coordinate, a C-B line of the first color card image can be obtained. In addition, the positioning device can find out the target color card from the predetermined form based on the first color card image and the second color card image. Based on the geometric center point coordinate of the target color card, the first geometric center point coordinate, and the first barycentric point coordinate, the barycentric point coordinate of the target color card can be obtained.

The difference $x_{B'} - x_{A'}$ is defined as a pixel difference between the x-coordinates of the first geometric center point coordinate and the first barycentric point coordinate. Based on the ratio s, the difference between the x-coordinates of the geometric center point coordinate and the barycentric point coordinate of the target color card can be obtained through ($x_{B'} - x_{A'}$)×s. The x-coordinate of barycentric point coordinate of the target color card can then be obtained. Similarly, the y-coordinate of the barycentric point coordinate of the target color card can be calculated. Thus the reference line between the geometric center point coordinate and the barycentric point coordinate in the target color card can be obtained. The ratio s can be obtained through the fight height and focal length of the camera in UAV.

In S216, after the reference line is obtained, the reference line can be taken as a reference, and the positive direction of the target color card can be configured as a reference direction. The head direction of the UAV before and after rotation can be obtained based on the reference line and the C-B line of the second color card image. Before the rotation of the UAV, the tail of the UAV can be set as being located at the geometric center point A of the target color card, and the head direction of the UAV before the rotation can be obtained based on the C-B line of the first color card image. Thus, a first angle between the reference line and the head direction of the UAV can be calculated. After the rotation of the UAV, the tail of the UAV can be set as being still located at the geometric center point A of the color card, the head direction of the UAV can be obtained based on the C-B line of the second color card image, and a second angle between the reference line and the head direction of the UAV can be calculated. Thus, a difference between the first angle and the second angle can be configured as the rotation angle. Furthermore, the rotation angle of the UAV can be calculated in real-time based on the head direction of the UAV.

Figure 7:
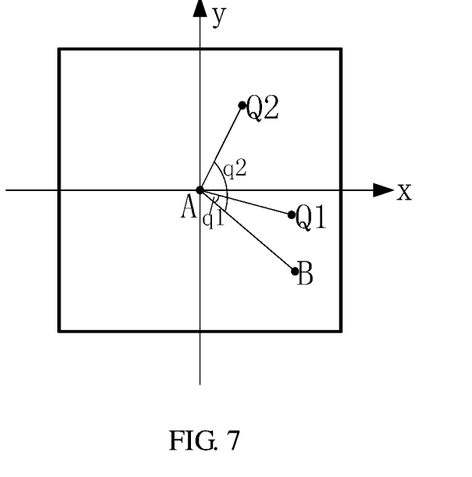
FIG. 7 is a schematic view of one embodiment of a rotation angle of the UAV.

Referring to FIG. 7, a head coordinate system can be established by taking the geometric center point A as the origin, the positive direction of y-axis as the positive direction of color cards. The barycentric point B is located in the card coordinate system, and the reference line AB is obtained. The first angle q1 can be obtained before rotation based on the first color card image and a first head direction AQ1 of the UAV, and the second angle q2 can be obtained after rotation based on a second head direction AQ2 of the UAV and the reference line AB. Thus the rotation angle (q2−q1) can be obtained.

In detail, the head direction of the UAV can be predetermined as the Y-axis of the photo coordinate system established in photos. Thus the first head direction AQ1 of the UAV in the card coordinate system, can be same as the direction of the Y-axis of the photo coordinate system by projecting the first photo onto the card coordinate system. Similarly, the second head direction head AQ2 of the UAV, can be same as a second direction of the Y-axis photo coordinate system by projecting the second photo onto the card coordinate system. In one embodiment, while the Y-axis of the photos is different from the head direction of the UAV, an angle can be existed between the Y-axis and the head direction of the UAV. The angle should be compensated before projecting the Y-axis onto the card coordinate system.

In order to improve accuracy of the rotation angle, at least three reference lines on three different color cards can be obtained, and at least three rotation angles based on the three reference line can be obtained respectively. Thus, the rotation angle of UAV can be determined based on the at least three reference lines.

In S217, after the positioning device recognizes the first color card image and the second color card image of the target color card from the first photo and the second photo, the positioning device can calculate the first geometric center point coordinate A1'($x_{A1'}$, $y_{A1'}$) of the first color card image, and the second geometric center point coordinate A2'($x_{A2'}$, $y_{A2'}$) of the second color card image based on the photo coordinate system. Because different photos are captured at different time, the first photo and the second photo can be captured in sequence.

In S218, after the first geometric center point coordinate and the second geometric center point coordinate in the photo coordinate system are obtained, the distance L between the first geometric center point coordinate and the second geometric center point coordinate in the photo coordinate system can be calculated based on $$L^2 = (x_{A1'} - x_{A2'})^2 + (y_{A1'} - y_{A2'})^2.$$  Pythagorean theorem:

The first photo and the second photo are captured in sequence, and the movement of the UAV changes the geometric center point coordinate of the color card image. The distance L between the first point coordinate and the second point coordinate can be defined as a pixel distance of the UAV moving during the time interval between taking the first photo and the second photo.

In S219, the flight distance S of the UAV can be obtained through S=dL/f. The time interval w between taking the first photo and the second photo is the flight time. The flight speed V can be calculated through: V=S/w.

It can be understood that if the photos are recognized in real-time, the positioning device can, in real-time, calculate the flight speed and the flight speed change. Furthermore, based on the relationship between the geometric center point coordinate in the photo coordinate system and the geometric center point coordinate in the card coordinate system of the predetermined form, the flight route of the UAV can be obtained.

Figure 8:
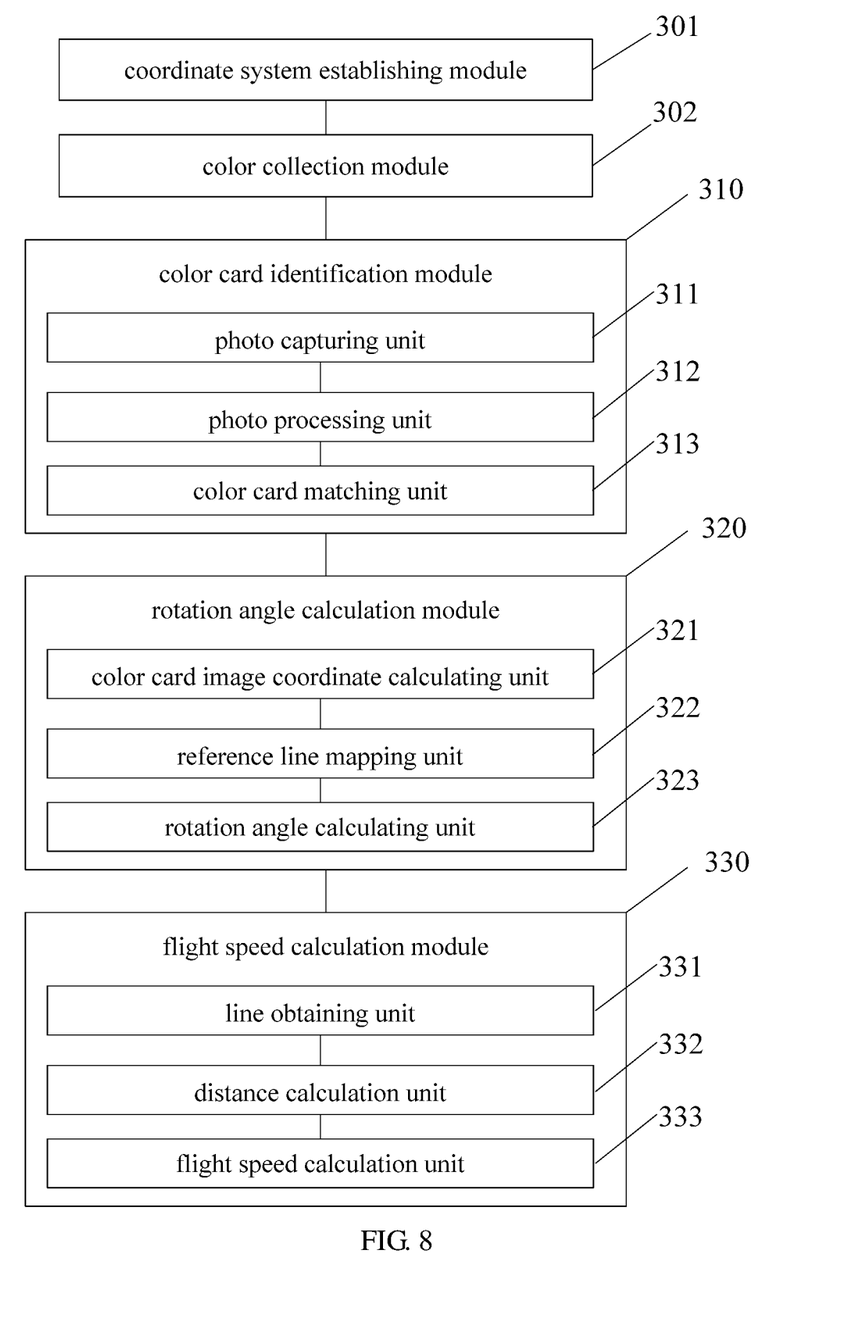
FIG. 8 is a block diagram of one embodiment of a positioning device for the UAV.

Referring to FIG. 8, one embodiment of a positioning device for the UAV is provided. The positioning device is configured to calculate the flight speed and rotation angle of the UAV based on captured photos of color cards. The positioning device can execute the positioning method above. The positioning device can be configured in a computer, especially in a memory in the computer.

The positioning device comprises a color card identification module 310, a rotation angle calculation module 320, and a flight speed calculation module 330.

The color card identification module 310 is configured to obtain at least two photos of a predetermined form, and recognize color card images of the target color card from the at least two photos by matching the at least two photos. The predetermined form comprises the plurality of color cards distributed on the ground. The rotation angle calculation module 320 is configured to calculate a geometric center point coordinate and a barycentric point coordinate in one color card image, obtain a reference line on the target color card based on the geometric center point coordinate and the barycentric point coordinate in the color card image, and calculate the rotation angle based on the reference line. The flight speed calculation module 330 is configured to calculate the first geometric center point coordinate of the first color card image and the second geometric center point coordinate of the second color card image in different photos, obtain the distance based on the first geometric center point coordinate and the second geometric center point coordinate, and calculate the flight speed of the UAV based on the distance.

In one embodiment, each of the plurality of color cards has different pattern. Each of the plurality of color cards is square and divided into 16 equal square blocks. The 16 equal square blocks belong to four districts. A first district of the color card comprises 3×3 square blocks and has a shape of a square. A second district of the color card comprises 1×4 square blocks and has a shape of rectangle. A third district of the color card comprises 1×2 square blocks and has a shape of a rectangle. A fourth district of the color card comprises a 1×1 square block and has a shape of a square. Each of the plurality of color cards can have a different color distribution. The first district, the second district, the third district, and the fourth district can be filled with four different colors. The four colors in each two of the plurality of color cards have different color distributions.

In one embodiment, the positioning device further comprises a coordinate system establishing module 301 and a color collection module 302. The coordinate system establishing module 301 is configured to establish the card coordinate system for the predetermined form in order to obtain the geometric center point coordinate of each of the plurality of color cards. The color collection module 302 is configured to collect color distribution in each of the plurality of color cards and set the positive direction of each of the plurality of color cards.

In one embodiment, the color card identification module 310 comprises a photo capturing unit 311, a photo processing unit 312, and a color card matching unit 313.

The photo capturing unit 311 is configured to obtain photos captured by the camera. The photo processing unit 312 is configured to obtain at least one color card image by processing the photos. The color card matching unit 313 is configured to recognize the color card images of the target color card from different photos by matching the color card images between different photos.

In one embodiment, the rotation angle calculating module 320 comprises a color card image coordinate calculating unit 321, a reference line mapping unit 322, and a rotation angle calculating unit 323.

The color card image coordinate calculating unit 321 is configured to obtain the geometric center point coordinate A'($x_{A'}$, $y_{A'}$) of the color card image, and calculate barycentric point coordinate B'($x_{B'}$, $y_{B'}$) of the color card image:

$$x_{B'} = \frac{\iint x\,dx\,dy}{\iint dx\,dy}, \quad y_{B'} = \frac{\iint y\,dx\,dy}{\iint dx\,dy}.$$

The reference line mapping unit 322 is configured to calculate the barycentric point coordinate B($x_B$, $y_B$) of the target color card based on the center point A($x_A$, $y_A$) of the target color card, the geometric center point coordinate A'($x_{A'}$, $y_{A'}$) and the barycentric point coordinate B'($x_{B'}$, $y_{B'}$), and obtain the line AB as a reference line: $x_B = (x_{B'} - x_{A'}) \times s + x_A$, $y_B = (y_{B'} - y_{A'}) \times s + y_A$, wherein s=d/f, s is a ratio between an actual distance in the predetermined form and a single pixel size of the photo taken by the camera, d is a flight height of the UAV, f is a focal length of the camera for taking the photos. The rotation angle calculating unit 323 is configured to calculate a first angle between the head direction of the UAV and the reference line, a second angle between the head direction of the UAV and the reference line, and determine the rotation angle by determining a difference between the first angle and the second angle which is configured as the rotation angle.

In one embodiment, the flight speed calculation module 330 comprises a line obtaining unit 331, a distance calculation unit 332, and a flight speed calculation unit 333.

The line obtaining unit 331 is configured to calculate the first geometric center point coordinate A1'($x_{A1'}$, $y_{A1'}$) of the first color card image and the second geometric center point coordinate A2'($x_{A2'}$, $y_{A2'}$) of the second color card image based on the predetermined photo coordinate system. The distance calculate unit 332 is configured to calculate the distance L between the first geometric center point coordinate A1'($x_{A1'}$, $y_{A1'}$) of and the second geometric center point coordinate A2'($x_{A2'}$, $y_{A2'}$) with the follow formula: $L^2 = (x_{A1'} - x_{A2'})^2 + (y_{A1'} - y_{A2'})^2$. The flight speed calculation unit is configured to calculate the flight speed of the UAV based on the flight distance of the UAV and the time interval between taking the first photo and the second photo, and the flight distance of the UAV is calculated via S=dL/f, wherein d is the flight height of the UAV, and f is the focal length of the camera for taking the photos.

The positioning device of the UAV can be capable of calculating the rotation angle based on the geometric center point coordinate and the barycentric point coordinate of the color card image, and calculating the flight speed based on the changes of geometric center point coordinates in different color card image of target color card. The positioning device of the UAV is independent from satellite positioning signal, low in cost, easy to control, high in positioning speed, and high in positioning accuracy.

For embodiments of the present disclosure, the processing of the present disclosure can be accomplished by a computer executable program, and this program can be realized in a computer-readable memory device.

In embodiments of the present disclosure, the memory device, such as a magnetic disk, a optical disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present disclosure, the computer executes each processing stage of the embodiments according to the program stored in the memory device. The computer may be one apparatus such as a personal computer or a system in which a plurality of processing apparatuses are connected through the network. Furthermore, in the present disclosure, the computer is not limited to the personal computer. Those skilled in the art will appreciate that a computer includes a processing unit in an information processor, a microcomputer, and so on. In short, the equipment and the apparatus that can execute the functions in embodiments of the present disclosure invention using the program are generally called the computer.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A positioning method for an unmanned aerial vehicle, the method comprising:
   obtaining a first photo and a second photo of a predetermined form from the unmanned aerial vehicle;
   recognizing a first color card image from the first photo, and a second color card image from the second photo by matching the first photo and the second photo, wherein the predetermined form comprises a plurality of color cards, and the first color card image and the second color card image are corresponding to the same target color card in the plurality of color cards;
   calculating a first geometric center point coordinate and a first barycentric point coordinate of the first color card image based on a photo coordinate system;
   determining a reference line on the target color card by mapping the first geometric center point coordinate and the first barycentric point coordinate to the target color card; and
   obtaining a rotation angle of the unmanned aerial vehicle based on the reference line.

2. The method of claim 1, further comprising:
   calculating a second geometric center point coordinate of the second color card image based on the photo coordinate system;
   obtaining a distance between the first geometric center point coordinate and the second geometric center point coordinate; and
   calculating a speed of the unmanned aerial vehicle based on the distance.

3. The method of claim 1, wherein the plurality of color cards have non-rotational-symmetry patterns different from each other.

4. The method of claim 3, wherein each of the plurality of color cards is a square and divided into 16 equal square blocks grouped into four districts, and the four districts are filled with four different colors.

5. The method of claim 4, wherein the four districts comprise a first district, a second district, a third district, and a fourth district; the first district comprises 9 square blocks arranged in a 3×3 pattern and has a shape of a square; the second district comprises 4 square blocks arranged in a 1×4 pattern and has a shape of a rectangle, the third district comprises 2 square blocks arranged in a 1×2 pattern and has a shape of a rectangle, and the fourth district comprises 1 square block, which has a shape of a square.

6. The method of claim 5, wherein the four districts in the plurality of color cards have four different distributions, and the plurality of color cards have different color distributions from each other.

7. The method of claim 1, wherein the determining the reference line on the target color card by mapping the first geometric center point coordinate and the first barycentric point coordinate to the target color card comprises:
   calculating a barycentric point coordinate of the target color card based on a geometric center point coordinate of the target color card, the first geometric center point coordinate, and the first barycentric point coordinate; and
   determining a reference line between the geometric center point coordinate and the barycentric point coordinate of the target color card.

8. The method of claim 1, wherein the obtaining the rotation angle of the unmanned aerial vehicle based on the reference line comprises:

calculating a first angle between the reference line and a first head direction of the unmanned aerial vehicle before rotation;

obtaining a second angle between the reference line and a second head direction of the unmanned aerial vehicle after rotation; and calculating the rotation angle by calculating a difference between the first angle and the second angle.

9. The method of claim 1, further comprising:

establishing a card coordinate system of the predetermined form and obtaining a geometric center point coordinate of each of the plurality of color cards of the predetermined form; and obtaining a pattern of each of the plurality of color cards and a positive direction of each of the plurality of color cards.

10. A positioning method for an unmanned aerial vehicle, the method comprising:

obtaining a first photo and a second photo of a predetermined form from the unmanned aerial vehicle, wherein the predetermined form comprises a plurality of color cards different from each other;

recognizing pre-matching color images from both the first photo and the second photo;

obtaining a first color card image and a second color card image from the first photo and the second photo by matching the pre-matching color card images with each other, wherein the first color card image and the second color card image are corresponding to a target color card, and both the first color card image and the second color card image are images of the target color card;

obtaining a first geometric center point coordinate A'($x_{A'}$, $y_{A'}$) of the first color card image in the first photo based on a photo coordinate system, and calculating a first barycentric point coordinate B'($x_{B'}$, $y_{B'}$) of the first color card image;

calculating a barycentric coordinate B($x_B$, $y_B$) based on a geometric center point coordinate A($x_A$, $y_A$) of the target color card, the first geometric center point coordinate A'($x_{A'}$, $y_{A'}$), and the first barycentric point coordinate B'($x_{B'}$, $y_{B'}$) of the first color card image, and taking a reference line between the center pint coordinate and the barycentric point coordinate;

calculating a first angle between the reference line and a first head direction of the unmanned aerial vehicle before rotation, calculating a second angle between the reference line and a second head direction of the unmanned aerial vehicle after rotation, and obtaining a rotation angle of the unmanned aerial vehicle by calculating difference between the first angle and the second angle;

calculating a first geometric center point coordinate A1' ($x_{A1'}$, $y_{A1'}$) of the first color card image and a second geometric center point coordinate A2'($x_{A2'}$, $y_{A2'}$) of the second color card image based on the predetermined photo coordinate system;

obtaining a distance L between the first geometric center point coordinate and the second geometric center point coordinate; and calculating a flight distance, and calculating a flight speed of the unmanned aerial vehicle based on a time interval between taking the first photo and taking the second photo.

11. The method of claim 10, wherein the first barycentric point coordinate B'($x_{B'}$, $y_{B'}$) of the first color image is calculated through formulas:

$$x_{B'} = \frac{\iint x\,dx\,dy}{\iint dx\,dy}, \text{ and}$$

$$y_{B'} = \frac{\iint y\,dx\,dy}{\iint dx\,dy}.$$

12. The method of claim 10, wherein the barycentric coordinate B($x_B$, $y_B$) is calculated by:

$$x_B = (x_{B'} - x_{A'}) \times s + x_A, \text{ and}$$

$$y_B = (y_{B'} - y_{A'}) \times s + y_A;$$

wherein s=d/f, d is a flight height of the unmanned aerial vehicle, and f is a focal length of the camera.

13. The method of claim 12, wherein the distance L between the first geometric center point coordinate and the second geometric center point coordinate is calculated by:

$$L^2 = (x_{A1'} - x_{A2'})^2 + (y_{A1'} - y_{A2'})^2;$$

and the flight distance S is calculated by:

$$S = dL/f.$$

14. A positioning device for an unmanned aerial vehicle, the positioning device comprising:

a color card identification module configured to obtain at least two photos of a predetermined form, and recognize color card images of a target color card from the at least two photos by matching the at least two photos, wherein the predetermined form comprises a plurality of color cards;

a rotation angle calculation module configured to calculate a geometric center point coordinate and a barycentric point coordinate in at least one of the color card images, configured to obtain a reference line on the target color card based on the geometric center point coordinate and the barycentric point coordinate in the at least one of the color card images, and configured to calculate a rotation angle based on the reference line.

15. The positioning device of claim 14, further comprising a coordinate system establishing module and a color collection module, wherein the coordinate system establishing module is configured to establish a card coordinate system for the predetermined form, and the color collection module is configured to collect a color distribution in each of the plurality of color cards and set a positive direction of the plurality of color cards.

16. The positioning device of claim 14, wherein the color card identification module comprises:

a photo capturing unit configured to obtain at least two photos captured from the unmanned aerial vehicle;

a photo processing unit configured to obtain the color card images by processing the at least two photos; and a color card matching unit configured to recognize the color card images of the same color card from the at least two photos by matching the at least two photos.

17. The positioning device of claim 14, wherein the rotation angle calculating module comprises:

a color card image coordinate calculating unit, wherein the color card image coordinate unit is configured to obtain the geometric center point coordinate and the barycentric point coordinate in the color card image;

a reference line mapping unit configured to obtain the reference line by calculating a barycentric point coordinate of the color card based on a center point of the color card, the geometric center point coordinate of the color card image and the barycentric point coordinate of the color card image; and a rotation angle calculating unit, wherein the rotation angle calculating unit is configured to calculated a first angle between a first head direction of the unmanned aerial vehicle and the reference line, a second angle between a second head direction of the unmanned aerial vehicle and the reference line, and get a difference between the first angle and the second angle.

18. The positioning device of claim 14, wherein the at least two photos comprise a first photo and a second photo, the color card images comprise a first color card image and a second color card image, and the positioning device further comprising:

a flight speed calculation module configured to calculate a first geometric center point coordinate of the first color card image and a second geometric center point coordinate of the second color card image in different photos, obtain a distance between the first geometric center point coordinate and the second geometric center point coordinate, and calculate a flight speed based on the distance.

19. The positioning device of claim 18, wherein the flight speed calculation module comprises:

a line obtaining unit configured to calculate the first geometric center point coordinate of the first color card image and the second geometric center point coordinate of the second color card image based on a predetermined photo coordinate system;

a distance calculation unit configured to calculate a distance L between the first geometric center point coordinate of and the second geometric center point coordinate; and a flight speed calculation unit configured to calculate the flight speed by calculating a flight distance based on the distance L and a time interval between taking the first photo and the second photo.

* * * * *